（12) United States Patent
Aird

(10) Patent No.: US 12,012,047 B1
(45) Date of Patent: Jun. 18, 2024

(54) SYSTEM WITH PROTECTION AND CONTAINER STRUCTURES INTEGRATED TOGETHER WITH SAFETY DEVICES

(71) Applicant: Alfred Theophilus Aird, New Braunfels, TX (US)

(72) Inventor: Alfred Theophilus Aird, New Braunfels, TX (US)

(73) Assignee: Alfred Theophilus Aird, New Braunfels, TX (US)

( * ) Notice: Subject to any disclaimer, the term of this patent is extended or adjusted under 35 U.S.C. 154(b) by 426 days.

(21) Appl. No.: 17/497,067

(22) Filed: Oct. 8, 2021

Related U.S. Application Data

(60) Provisional application No. 63/089,463, filed on Oct. 8, 2020.

(51) Int. Cl.
*B60R 11/06* (2006.01)
*B60R 1/00* (2022.01)
*B60R 9/06* (2006.01)
*B60D 1/62* (2006.01)

(52) U.S. Cl.
CPC .............. *B60R 11/06* (2013.01); *B60R 1/002* (2013.01); *B60R 9/06* (2013.01); *B60D 1/62* (2013.01)

(58) Field of Classification Search
CPC ........... B60R 11/06; B60R 1/002; B60R 9/06; B60R 9/065; B60R 2021/0083; B60R 5/041; B60R 5/042; B60R 2011/004; B60R 2011/0288; B62D 33/0207; B60Q 1/2657
USPC ............... 296/37.6, 3, 24.43, 24.44; 280/769
See application file for complete search history.

(56) References Cited

U.S. PATENT DOCUMENTS

| 5,121,306 A | * | 6/1992 | Palmisano | B60R 9/00 362/253 |
| 5,183,307 A | * | 2/1993 | Chiu, Jr. | B60R 9/00 296/99.1 |
| 8,038,195 B1 | * | 10/2011 | Hutcheson | B60R 9/00 296/136.04 |
| 2003/0011180 A1 | * | 1/2003 | Coffman | B60R 21/02 280/748 |
| 2006/0284437 A1 | * | 12/2006 | Collins | B60P 1/003 296/37.6 |
| 2007/0102949 A1 | * | 5/2007 | Andrews | B60R 9/00 296/37.6 |

(Continued)

*Primary Examiner* — Amy R Weisberg
*Assistant Examiner* — Wenwei Zhuo
(74) *Attorney, Agent, or Firm* — S. Scott Foster; Kowert, Hood, Munyon, Rankin & Goetzel, P.C.

(57) ABSTRACT

In safety system for a truck having a truck bed, where the truck bed has sidewalls, a container structure is connected to a protection structure, wherein the container structure includes a toolbox connected to first and second storage units, where each storage unit is positioned on the toolbox to overhang a respective one of the sidewalls when the toolbox is fitted between the sidewalls, and the storage units define respective openings above the respective sidewalls for accessing interiors of the respective storage units from outside the truck bed. The protection structure has rigid members, each member including lateral portions and a central portion. The lateral portions are connected to the container structure and support the respective central portions above a cab of the truck for protection against overhead impact when the toolbox is fitted between the sidewalls.

20 Claims, 12 Drawing Sheets

(56) References Cited

U.S. PATENT DOCUMENTS

| | | | | |
|---|---|---|---|---|
| 2010/0301721 | A1* | 12/2010 | Nebel | B60R 11/06 211/126.15 |
| 2011/0037286 | A1* | 2/2011 | Nebel | B60R 11/06 384/19 |
| 2011/0285162 | A1* | 11/2011 | Kuklok | B60R 9/00 296/37.6 |
| 2012/0267404 | A1* | 10/2012 | Rottinghaus | B60R 9/065 224/547 |
| 2012/0292359 | A1* | 11/2012 | O'Dell | B60R 11/06 224/403 |
| 2015/0175089 | A1* | 6/2015 | Reed, III | B60R 11/06 224/404 |
| 2016/0362070 | A1* | 12/2016 | Reed, III | B60Q 1/44 |
| 2020/0156555 | A1* | 5/2020 | Reed, III | B60R 11/06 |
| 2020/0238919 | A1* | 7/2020 | LeDonne | B60R 9/065 |
| 2020/0398739 | A1* | 12/2020 | Hanson | B60Q 1/22 |
| 2022/0266775 | A1* | 8/2022 | Mezaael | B60R 16/0231 |

* cited by examiner

Back View

Top View

SYSTEM WITH PROTECTION AND CONTAINER STRUCTURES INTEGRATED TOGETHER WITH SAFETY DEVICES

BACKGROUND

Recently, about 40% of U.S. mining related fatalities involve mobile equipment and over 30% of injuries involve mobile equipment, according to the U.S. Mine Safety and Health Administration. In a period of about five years recently, 52 persons reportedly died at U.S. mine sites from accidents involving mobile equipment. Similar issues exist in some industries regulated by the U.S. Occupational Safety and Health Administration.

Embodiments of the present invention involve a recognition that the size and shape of mine and construction site equipment and the operator cab location create unique blind areas which contribute to operators driving over highwalls or dump points, colliding with other equipment and striking miners.

It is known to install certain types of collision avoidance systems on pickup trucks in order to make the trucks more visible to large equipment having oversized blind spots. Also, extra lighting is often provided in mining and construction site environments to improve visibility at night, and extra lighting may be conventionally purchased as individual components for adding to pickup trucks after market. Nevertheless, the number of deaths and injuries caused by mobile equipment indicate unrecognized and unaddressed difficulties in providing safety equipment on vehicles, in general, and on pickup trucks, in particular.

BRIEF DESCRIPTION OF THE FIGURES

Numbered elements shown in more than one Figure herein may have the same numbers in each of the Figures.

DETAILED DESCRIPTION

Figure 1:
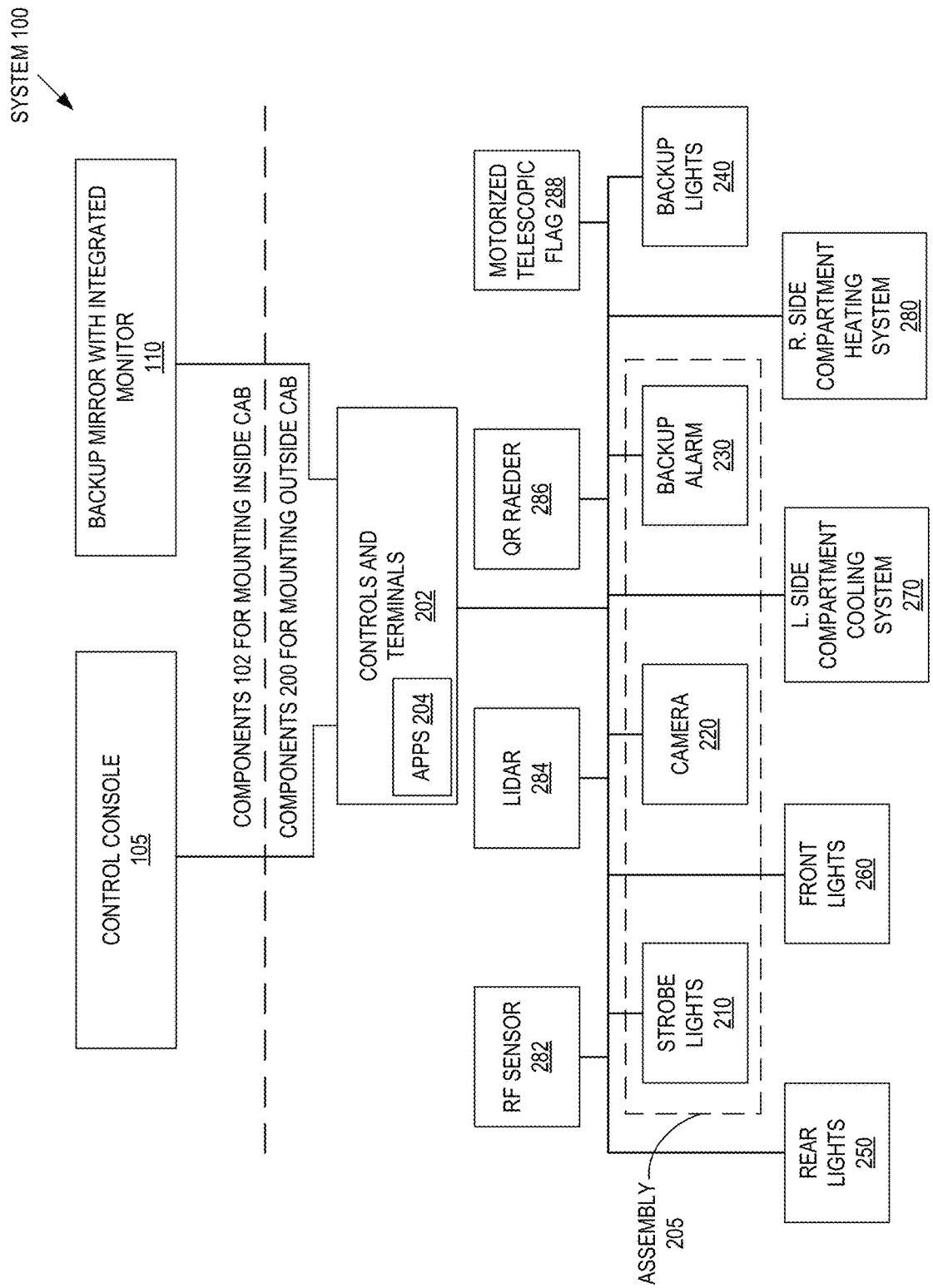
FIG. 1 depicts electrical components located on a safety system for a truck, according to one or more embodiments of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention involve a recognition of the specific nature of the difficulties and provide a headache rack integrated with safety equipment, which includes mounts and storage configured for securing the safety equipment. The various embodiments involve a recognition by the inventor of specific difficulties in conventional ways of providing vehicle safety equipment—difficulties that have not been previously recognized. Accordingly, the embodiments address these difficulties, thereby improving safety at the work site.

In one aspect, an embodiment of the present invention provides safety devices in a system including protection and container structures integrated into a single unit and provided for a pickup truck having a bed with side walls in a rear portion of the truck. With reference to FIGS. 1 through 10 and elements numbered therein, system 100 includes a protection structure having first and second bars 410 and 420, each respective one of which includes lateral portions joined by a central portion, wherein the central portion holds the lateral portions apart for fitting ends of the lateral portions between the side walls, wherein the lateral portions are configured to hold the central portion above and along a cab roof of the pickup truck when the ends of the lateral portions are positioned between the side walls. (Herein, the terms "bar," "tube" and "rigid member" are used interchangeably. It should be understood that the term "bar" may also indicate a tube or other rigid member, the term "tube" may, likewise, also indicate a bar or other rigid member, and the term "rigid member" may indicate bar, a tube or some other type of rigid member.) Structure may further include a shell connected to the bars and spanning at least a portion of space therebetween. A flag whip mounting bracket may be an included feature that is fixed to one of the bars.

System 100 also has a container structure including a toolbox 300 connected to ends of the lateral portions of the bars and side storage units 415 and 4418 attached to the shell and held between the lateral portions of the bars. The toolbox may rest on the truck bed and may be attached thereto or to sidewalls of the truck bed, or both.

The system also has safety devices including a flag whip mount 30 motorized for a telescoping pole and includes other devices, where the devices include strobe lights 210, cameras 220, including a backup camera, a backup monitor 110, a backup audible device operable to make various sounds, backup lights 240 and high beam front and rear lights 250 and 260 mounted on the protection structure. An assembly 205 of the system includes a housing containing the strobe lights 210 and the backup camera 220. The housing is fastened to the structure in a position such that the structure holds the housing above the cab roof when the ends of the lateral portions are positioned between the side walls. The strobe lights are visible through openings in the housing when the strobe lights are turned on. A lens of the backup camera points toward the rear of the pickup truck on which the system is mounted through an opening in the housing.

The monitor and the camera are configured to communicate when the camera is active to produce a video stream from the camera on the monitor. The backup horn is attached to the structure and has controls configured to receive a signal from transmission linkage of the truck. The backup horn controls responsively produce an audio alarm when the linkage indicates a reverse gear of the truck is engaged. The high beam lights are attached to the structure in positions such that when the ends of the lateral portions are positioned between the side walls the structure holds the high beam lights above the cab roof pointing ahead of the pickup truck.

The backup lights are attached to the structure in positions such that when the ends of the lateral portions are positioned between the side walls the structure holds the backup lights pointing beyond the rear portion of the pickup truck. The backup lights has controls configured to receive the signal from the transmission linkage and responsively turn on the lights when the linkage indicates a reverse gear of the truck is engaged.

The system also has a control console 105 wired to activate and deactivate at least some of the electronic safety devices.

In another aspect, the system includes cooling equipment 270 configured for cooling at least one of the side compartments.

In another aspect, the monitor 110 is integrated into a mirror for attachment to the truck.

In another aspect, the system has second high beam lights, wherein the second high beam lights are attached to the structure in positions such that when the ends of the lateral portions are positioned between the side walls of the pickup truck bed the structure holds the second high beam lights pointing behind the pickup truck.

In another aspect, the lateral portions of the bars are configured for connecting to the side walls. Alternatively, the lateral portions of the bars are connected to the tool chest. Alternatively, the lateral portions of the bars are connected to the tool chest and are configured for also connecting to the side walls.

Figure 10:
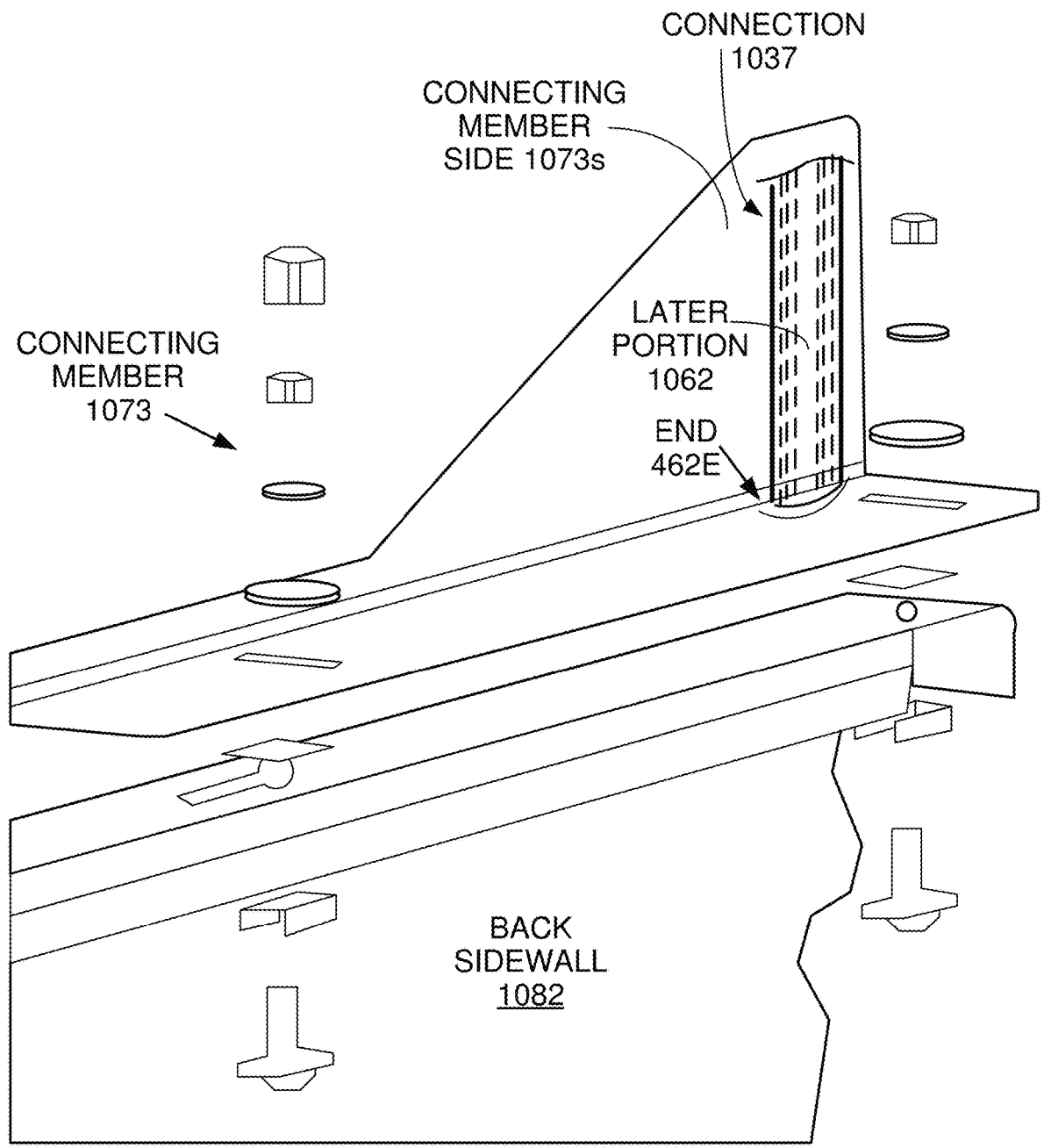
FIG. 10 depicts details of bolting safety system for a truck to the top sides of a truck bed via a bracket, according to one or more embodiments of the invention.

In one or more embodiment of the present invention protection structure (which may also be referred to as a headache rack or a "GoViz" headache rack) has a front tube 410 and rear tube 420 and a shell body 411 therebetween. Tubes 10 and 20 and shell body 411 may be steel or aluminum and may have a sheet or wall thickness of $\frac{7}{32}$", $\frac{1}{4}$" or $\frac{9}{32}$", for example. Front tube 410 and rear tube 420 of rack have side sections that terminate at sides of a vehicle, such as a pickup bed, and horizontal sections therebetween that are securely held above the vehicle cab (not shown) by the side sections. The side sections may be vertical, curved or angled. In an embodiment, rack is bolted to the top sides of a pickup truck bed via a bracket provided as shown in FIG. 10. In general, rack may be provided in custom colors and may be configured in sizes and shapes to fit respective truck brands and models of any type.

Figure 2:
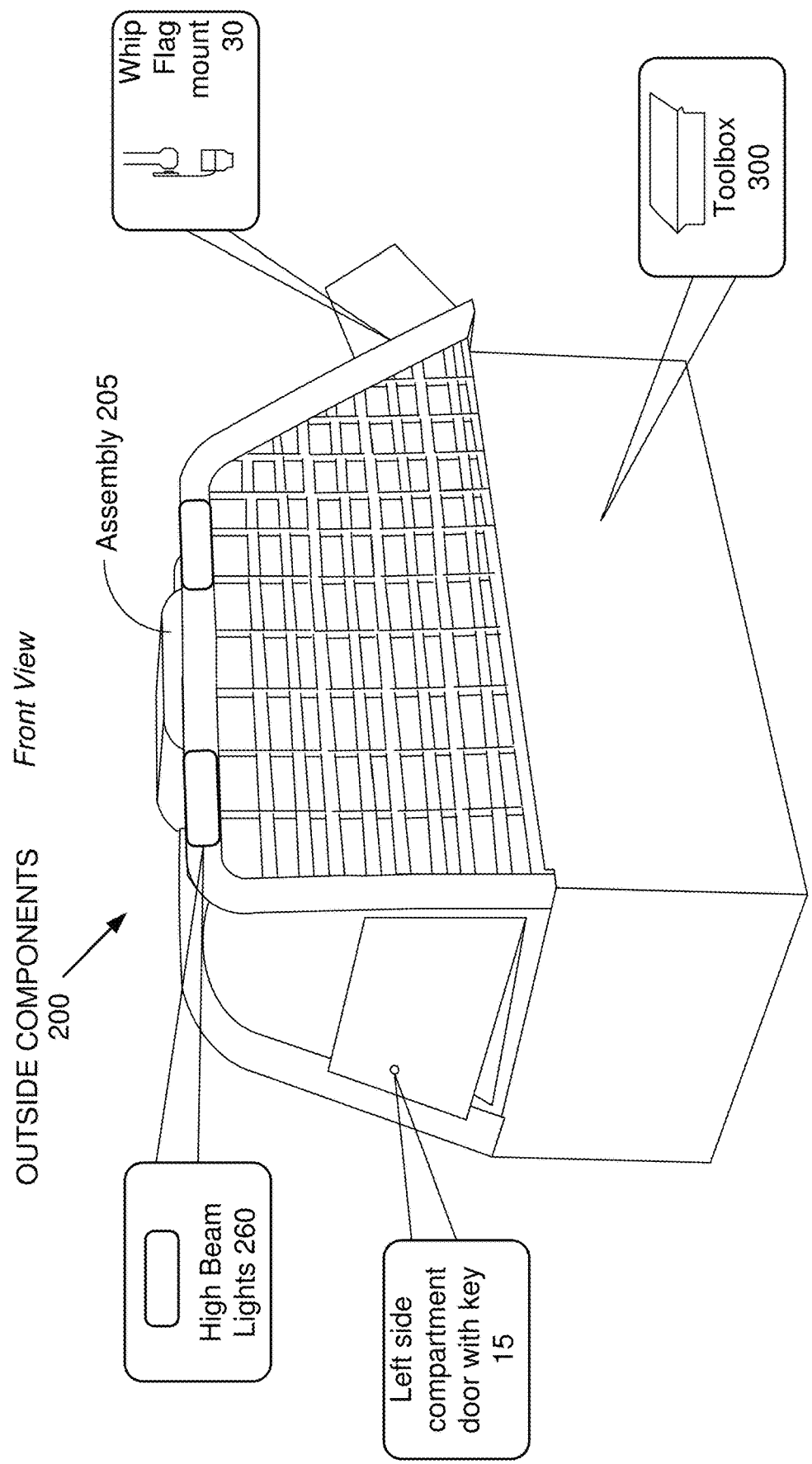
FIG. 2 is a front isometric view of a safety system for a truck, according to one or more embodiments of the invention.
Figure 3:
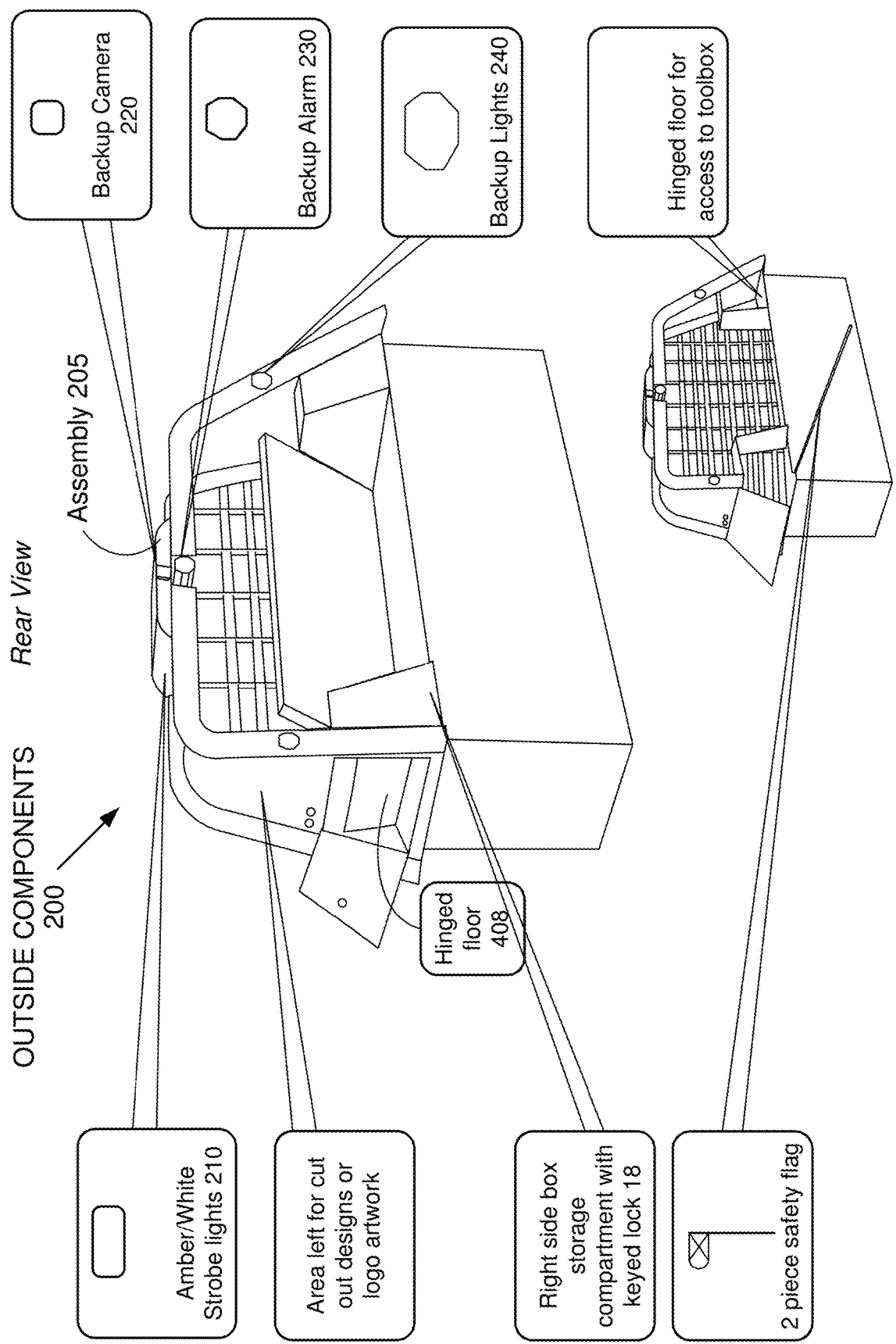
FIG. 3 is a rear isometric view of a safety system for a truck, according to one or more embodiments of the invention.
Figure 4:
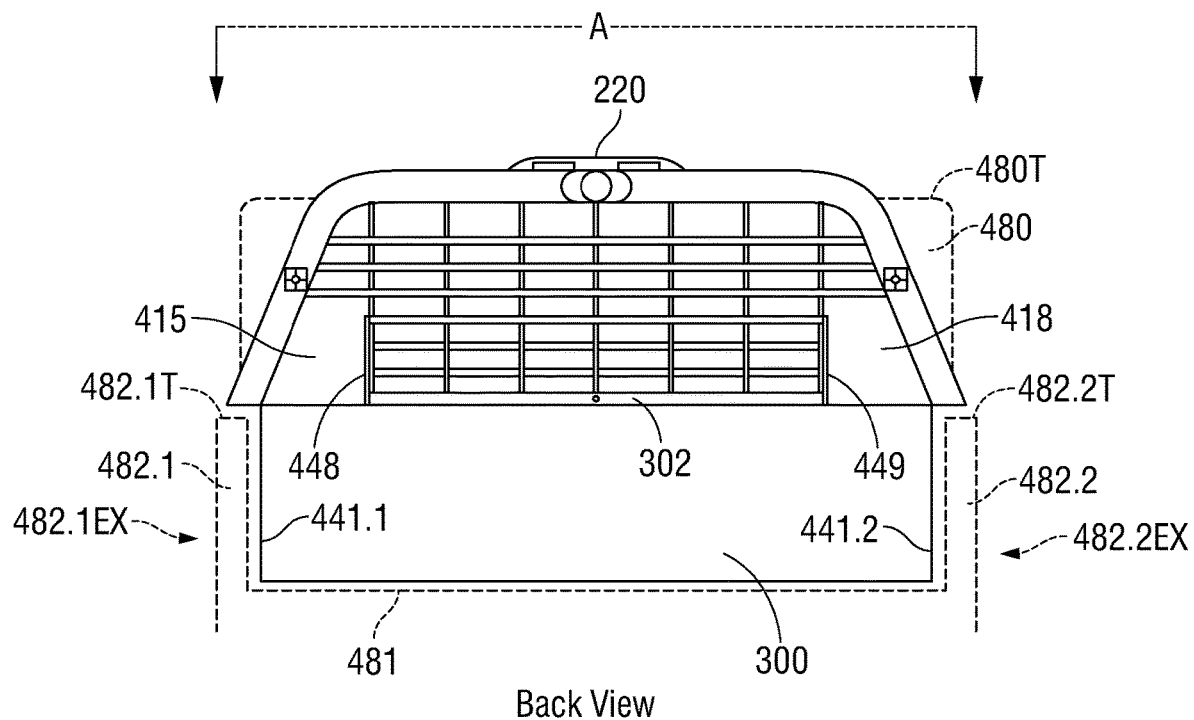
FIG. 4 is a rear orthogonal view of a safety system for a truck, according to one or more embodiments of the invention.
Figure 4A:
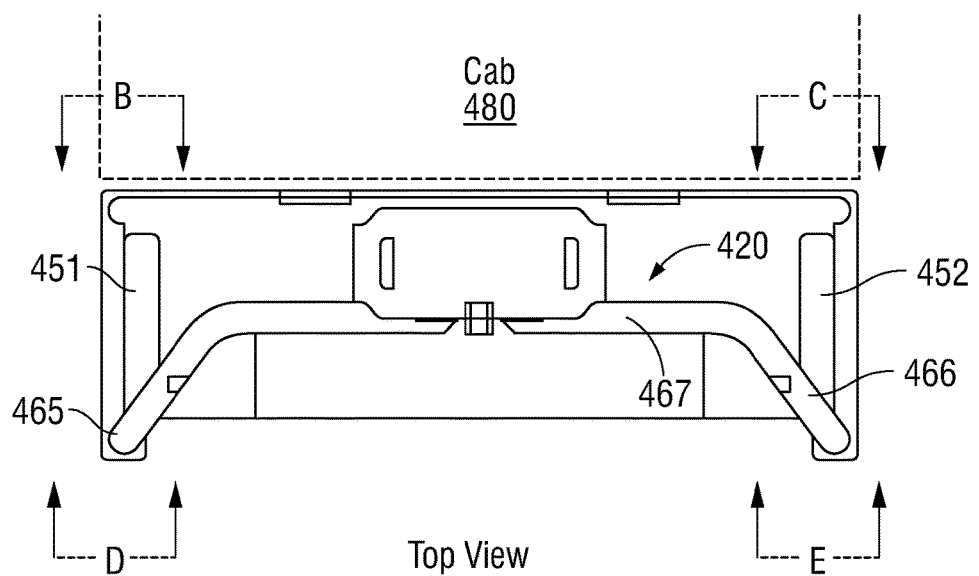
FIG. 4A is a top orthogonal view of a safety system for a truck, according to one or more embodiments of the invention.
Figure 4B:
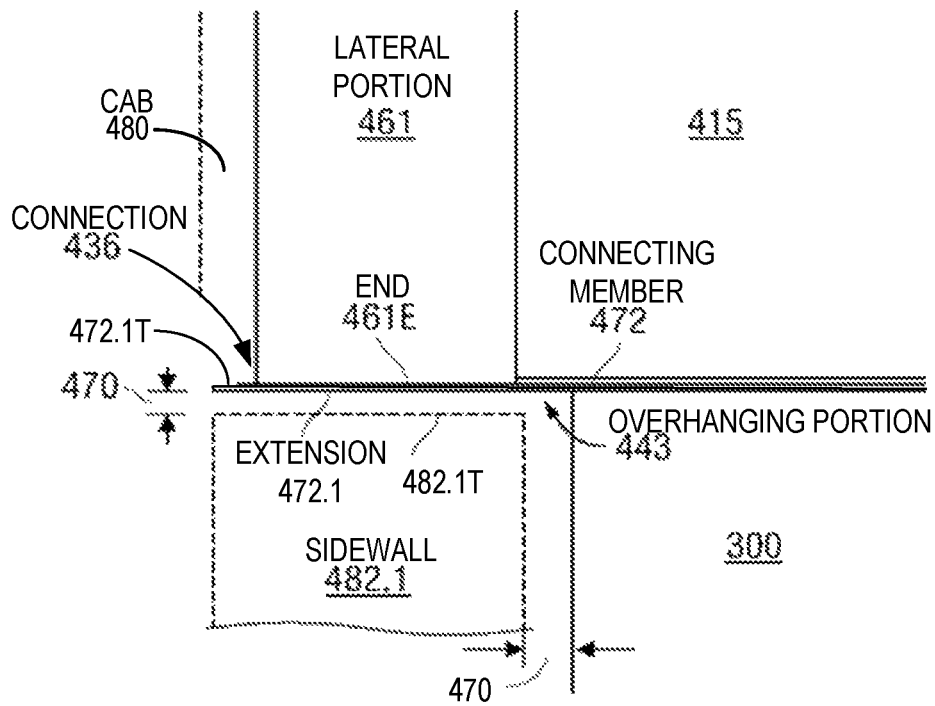
FIG. 4B is a side orthogonal view of a safety system for a truck, according to one or more embodiments of the invention.
Figure 4C:
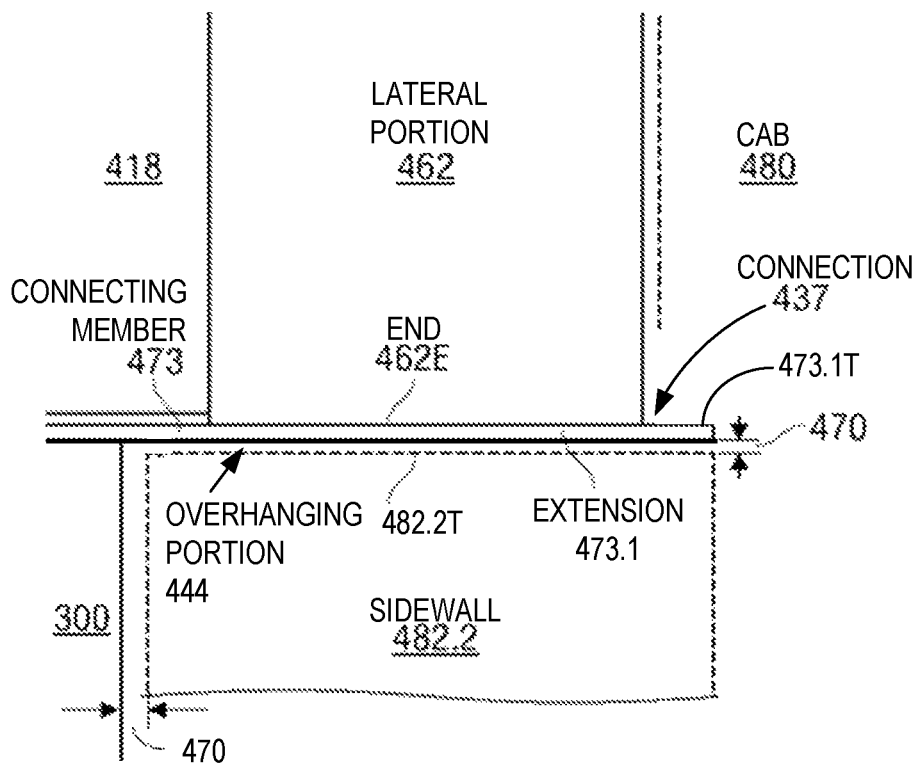
FIG. 4C is a side orthogonal view of a safety system for a truck, according to one or more embodiments of the invention.
Figure 4D:
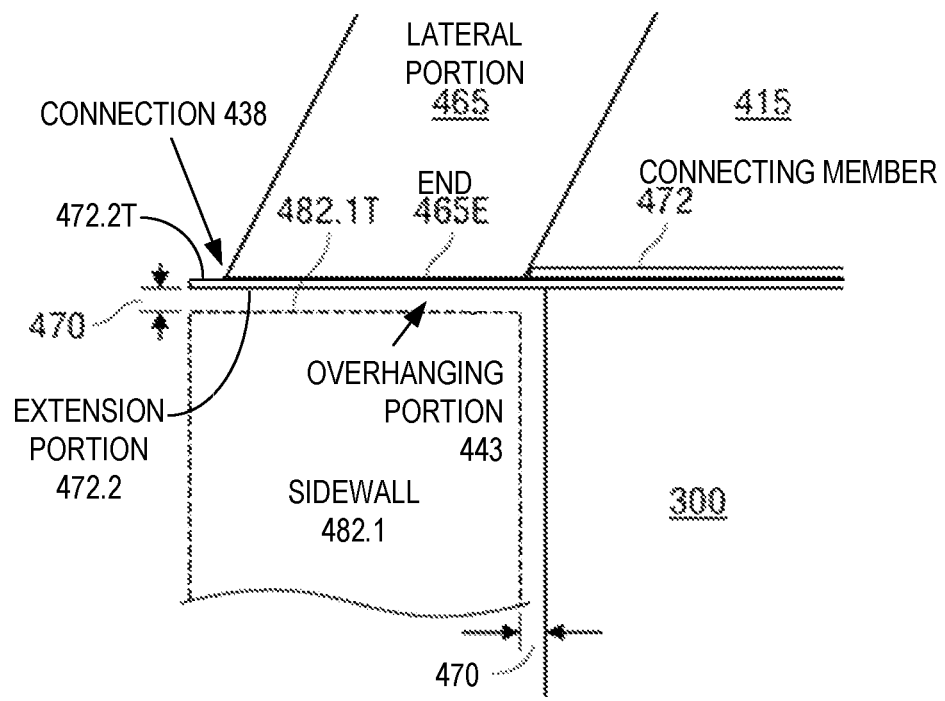
FIG. 4D is a side orthogonal view of a safety system for a truck, according to one or more embodiments of the invention.
Figure 4E:
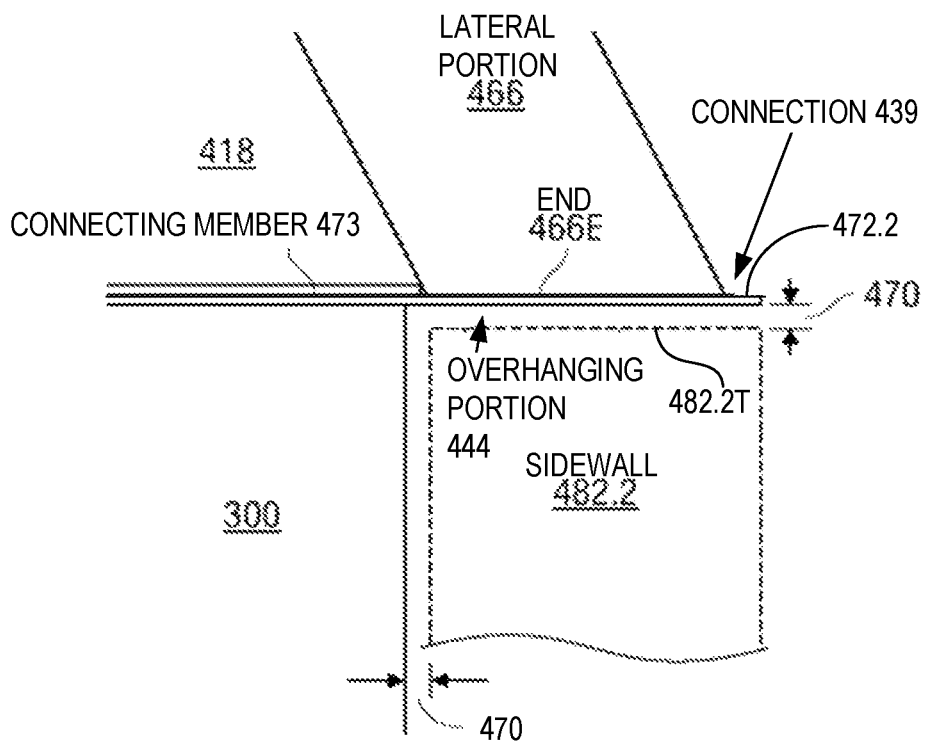
FIG. 4E is a side orthogonal view of a safety system for a truck, according to one or more embodiments of the invention.
Figure 6:
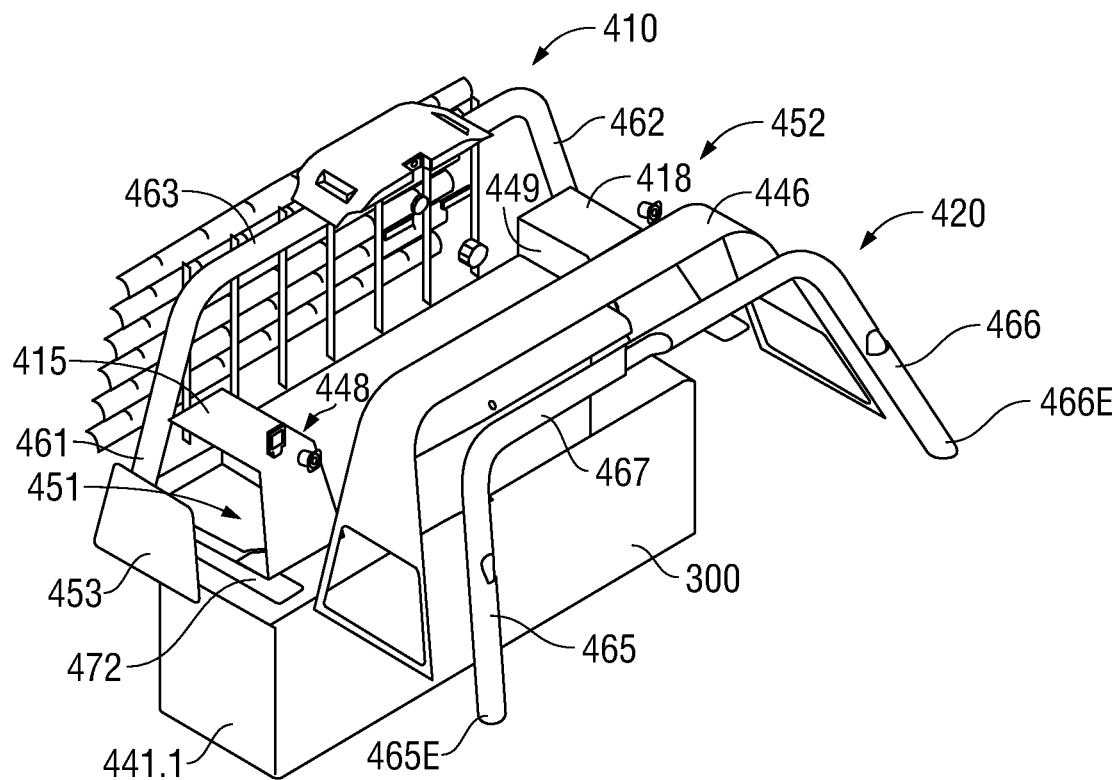
FIG. 6 is an exploded isometric view, including left side, of a safety system for a truck, according to one or more embodiments of the invention.

Referring now particularly to FIGS. 4, 4A-E, 5 and 6, certain aspects of the safety system 100 of FIGS. 1 through 3 are shown in more detail for adding to a truck, according to at least one embodiment of the present invention. More specifically, system 100 is configured for placing in any of a variety trucks that have a cab 480 in front of a truck bed 481 thereof, where truck bed 481 has sidewalls 482.1 and 2. System 100 includes a protection structure which is configured to protect top 480T of cab 480 from impact, and includes a container structure having connections 436, 437, 438 and 439 to the protection structure.

In the illustrated embodiment(s), protection structure includes a first rigid member 410 having first and second lateral portions 461 and 462 joined by a central portion 463 having a length that, when the toolbox 300 is between the truck bed sidewalls 481.1 and 481.2, positions the first lateral portion 461 nearby first truck bed sidewall 482.1 for a first one of the connections 436 to the container structure and positions the second lateral portion 462 nearby second truck bed sidewall 482.2 for a second one of the connections 437 to the container structure. Similarly, protection structure includes a second rigid member 420 further aft of cab 480 having first and second lateral portions 465 and 466 that are joined by a central portion 467 of second rigid member 420 having a length that, when toolbox 300 is between the truck bed sidewalls 482.1 and 482.2, positions the second rigid member's first lateral portion 465 nearby first truck bed sidewall 482.1 for a third one of the connections 438 to the container structure and positions the second rigid member's second lateral portion 466 nearby second truck bed sidewall 482.2 for a fourth one of the connections 439 to the container structure.

(It should be understood that "nearby" the respective sidewalls 482.1 and 2, as the term is used herein above, refers to "within a predetermined distance" 470 from each respective sidewall 482.1 and 2, such as 0.25 inches+/−0.125 inches, for example, or such as 0.5+/−0.25 inches, for example. The distance may refer to a distance from the interior side of a truck bed sidewall or directly above a top of a truck bed sidewall, depending on the configuration. The lengths of central portions 463 and 467 are predetermined since they depend on the width between sidewalls 482.1 and 2, which is a known, predetermined width for each truck.)

The lateral portions 461, 462, 465 and 466 of the rigid members 410 and 420 are of predetermined lengths that position their respective central portions 463 and 467 above a top 480T of the truck's cab 480 when toolbox 300 is between the truck bed sidewalls 481.1 and 481.2. (The lengths of lateral portions 461, 462, 465 and 466 are predetermined since they depend on the height of top 480T above truck bed 481, which is a known, predetermined width for each truck.)

Container structure includes a toolbox 300 of a predetermined length that fits between first and second sidewalls 482.1 and 2 of truck bed 481. (Toolbox 300 length is predetermined since it depends on the width between sidewalls 482.1 and 2 of a particular truck on which the system is fitted, which is a known, predetermined width for each truck.) When the toolbox 300 is fitted between truck bed sidewalls 482.1 and 482.2, a first side 441.1 of toolbox 300 faces first sidewall 482.1 and a second side 441.2 of toolbox 300 faces second sidewall 482.2. Container structure also includes a first storage unit 415 mounted to toolbox 300 in a cantilever position above first toolbox side 441.1, wherein an overhanging portion 443 of the first storage unit 415 overhangs a top 482.1T of first truck bed sidewall 482.1 when toolbox 300 is fitted between truck bed sidewalls 482.1 and 482.2. Correspondingly, container structure also includes a second storage unit 4418 mounted to toolbox 300 in a cantilever position above second toolbox side 441.2, wherein an overhanging portion 444 of the second storage unit 4418 overhangs a top 482.2T of second truck bed sidewall 482.2 when toolbox 300 is fitted between truck bed sidewalls 482.1 and 482.2.

First storage unit 415 has a first side 448 facing a first side 449 of second storage unit 4418. Toolbox 300 has a top lid 302 between first sides 448 and 449 of the respective storage units 415 and 4418. First storage unit 415 defines an opening 451 opposite the first storage unit's first side 448 and has a cover 453 on the opening 451 configured to open for accessing an interior of the first storage unit 415. When toolbox 300 is fitted between truck bed sidewalls 482.1 and 482.2, the interior of the first storage unit 415 is accessible through opening 451 to a user outside the truck bed 481 facing an exterior side 482.1 EX of the first truck bed sidewall 482.1. Likewise, second storage unit 4418 defines an opening 452 opposite the second storage unit's first side 449 and has a cover 454 on the second storage unit's opening 452 configured to open for accessing an interior of the second storage unit 4418. When toolbox 300 is fitted between truck bed sidewalls 482.1 and 482.2, the interior of the second storage unit 4418 is accessible through the second storage unit 4418 opening 452 to a user outside the truck bed 481 facing an exterior side 482.2 EX of the second truck bed sidewall 482.2.

Container structure connects to protection structure in embodiments of the present invention. This may be done in a variety of ways such as the following and combinations of the following, including partial combinations thereof.

For one way of connecting to protection structure, container structure includes a first connecting member 472 attached to overhanging portion 443 of first storage unit 415 (such as attached to the bottom of overhanging portion 443, for example) and includes first and second extension portions 472.1 and 472.2 extending beyond overhanging portion 443 of first storage unit 415 and along portions of top 481.1T of the truck bed's first sidewall 482.1 when the toolbox 300 is fitted between the truck bed sidewalls 482.1 and 482.2. Similarly, container structure includes a second connecting member 473 attached to overhanging portion 444 of second storage unit 4418 (such as attached to the bottom of overhanging portion 443, for example) and includes first and second extension portions 473.1 and 473.2 extending beyond overhanging portion 444 of second storage unit 4418 and along portions of top 481.2T of the truck bed's second sidewall 481.2 when toolbox 300 is fitted between the truck bed sidewalls 481.1 and 481.2.

According to one way of connecting like this, container structure connections to protection structure may include connection 436 of first lateral portion 461 of first rigid member 410 to first extension portion 472.1 of first connecting member 472, connection 437 of second lateral portion 462 of first rigid member 410 to first extension portion 473.1 of second connecting member 473, connection 438 of first lateral portion 465 of second rigid member 420 to second extension portion 472.2 of first connecting member 472, and connection 439 of second lateral portion 466 of second rigid member 420 to second extension portion 473.2 of second connecting member 473.

Further, in this way of connecting, connection 436 may include connection of an end 461E of first lateral portion 461 of first rigid member 410 to a top 471.1T of first extension portion 472.1 of first connecting member 472, connection 437 may include connection of an end 462E of second lateral portion 462 of first rigid member 410 to a top 473.1T of first extension portion 473.1 of second connecting member 473, connection 438 may include connection of an end 465E of first lateral portion 465 of second rigid member 420 to a top 472.2T of second extension portion 472.2 of first connecting member 472, and connection 439 may include connection of an end 466E of second lateral portion 466 of second rigid member 420 to a top 473.2T of second extension portion 473.2 of second connecting member 473.

According to one way of connecting like this, connection 436 may include connection of first lateral portion 461 of first rigid member 410 to a side of first extension portion 472.1 of first connecting member 472, connection 437 of second lateral portion 462 of first rigid member 410 to a side of first extension portion 473.1 of second connecting member 473, connection 438 of first lateral portion 465 of second rigid member 420 to a side of second extension portion 472.2 of first connecting member 472, and connection 439 of second lateral portion 466 of second rigid member 420 to a side of second extension portion 473.2 of second connecting member 473.

In a similar manner, FIG. 10 shows connection 1037 of second lateral portion 462 to a side 1073S of a connection member 1073, which in turn is well suited, and intended for, connection to a back sidewall 1082 of a truck bed, according to an embodiment. (It should be understood that the disclosed safety system is well suited to be connected, and is intended for connection, to one or more sidewalls of a truck bed or to the truck bed itself or both.)

For another way of connecting to protection structure, connection 436 of first lateral portion 461 of first rigid member 410 may alternatively or additionally include connection to a front side of first storage unit 415 or a front side of toolbox 300 below first storage unit 415 or both, connection 437 of second lateral portion 462 of first rigid member 410 may include connection to a front side of second storage unit 4418 or a front side of toolbox 300 below second storage unit 4418 or both, connection 438 of first lateral portion 465 of second rigid member 420 to a back side of first storage unit 415 or a back side of toolbox 300 below first storage unit 415 or both, and connection 439 of second lateral portion 466 of second rigid member 420 to a back side of first storage unit 415 or a back side of toolbox 300 below first storage unit 415 or both. (In this paragraph, "front side" refers to a side nearest cab 480 and "back side" refers to a side opposite the front side.) This way of connecting is particularly well suited for an arrangement, according to one or more embodiments of the present invention, in which the lateral portions of first and second rigid members 410 and 420 extend all the way to the truck bed instead of connecting to tops of the truck bed sidewalls.

At least one embodiment of the present invention includes a process of providing a safety system for a truck having a truck bed, wherein the truck bed has sidewalls, the method comprising connecting as described herein a container structure and a protection structure as described herein. The process may include placing the container structure and a protection structure in a truck bed and connecting the system to the truck, such as connecting to the truck bed, sidewalls of the truck bed, or both.

Various ones of the embodiments include all or selected ones of the following features.

Flag whip mount 30 is fixed halfway up front tube 410 of headache rack for optimum height of a flag whip (not shown), eliminating the need for installing a flag whip mount directly on a truck. The flag whip may be in 2 or 3 sections depending on the maximum height required, where the sections include push-in couplings for joining the sections together. When not mounted, the sections are conveniently stored in toolbox 300 on side wall clips that are included and are accessible through side storage compartments 415 and 418.

Strobe lights 210 are integrated into a low profile and aesthetically pleasing assembly 205 mounted on a top, horizontal portion of headache rack centered side-to-side, such as on shell body 411. Assembly 205 has six ports for respective strobe lights 210 located so that the strobe lights 210 are remotely visible from any angle. Strobe lights 210 may be amber and white or any other color combination.

Backup audible alarm 220 includes a horn located below assembly 205 on a recessed portion of a horizontal section of headache rack rear tube 420, wherein the horn may be fixed to, and structurally part of, assembly 205 or may be structurally independent of assembly 205 and attached to tube 420. A switch or other means is provided at control console 105 to easily switch alarm 220 from an automatic mode, in which the alarm is activated automatically in response to engaging the vehicle transmission in reverse gear, to a manual mode, in which the driver can activate the alarm. A volume control for alarm 220 is also provided at control console 105. The embedded placement into tube 420 tends to more effectively transmit the sound of the alarm to mitigate low visibility.

Rear facing backup camera 220 is included in low profile assembly 205 that is fixed on shell body 411. Backup camera 220 communicates with a monitor 110 to present a view behind the vehicle. Camera 220 placement is high on headache rack, which gives a bird's eye view of loads being hauled. Backup camera 220 may include a backup mirror into which monitor 110 is integrated for displaying the camera 220 view when requested or when reversing. By occasionally checking monitor 110 from within the cab, the driver is enabled to detect any shift in loads or loosening of tie down ropes etc.

High beam flood lights 260 are strategically fixed high up on front tube 410 facing forward to give additional lighting, as shown. In an embodiment, lights 260 are attached inside tube 410 and openings are formed therein so a respective one of lights 260 shines out of each respective opening. Alternatively, each one of lights 260 fits into a respective recessed part of tube 410 and attaches therein. Additional high beam lights 250 may also be provided on rear tube 420 facing backward in an embodiment.

Side storage compartments 415 and 418 are positioned on the sides of headache rack and allow secured storage of PPE equipment, safety kits, wheel chocks and other small tools. Hydration is an important part of safety. Workers, especially those outdoors, are reminded to drink water regularly to prevent loss time incidences on the job associated with dehydration. Accordingly, one or both of side storage compartments 415 and 418 may be modified into an insulated cold storage for cooling water and also for cooling food. For example, bananas are a reliable source of electrolytes.

In an embodiment of the present invention, cooling is done using filtered input air from vents on the headache rack and ducted to an included vortex tube, where the air is cooled and use for refrigerating the contents of the compartment. See, for example, the Vortex AC Enclosure Cooler System depicted in FIGS. 7 and 8. The heated portion of the air may be expelled or is temperature regulated and used to warm or dry contents in the other compartment. In an embodiment, one or more thermostats and air compressors are provided, such as attached on the back wall inside of toolbox 300.

Toolbox 300 may be accessible through side storage compartments 415 and 418 via a hinged floor 408. Toolbox 300 may be compartmentalized as needed so the that middle portion is walled off from the side storage compartments to function as a standalone unit. Toolbox 300 may include a cam lock. Toolbox 300 may include lighting inside, activated when the toolbox lid is open.

Figure 5:
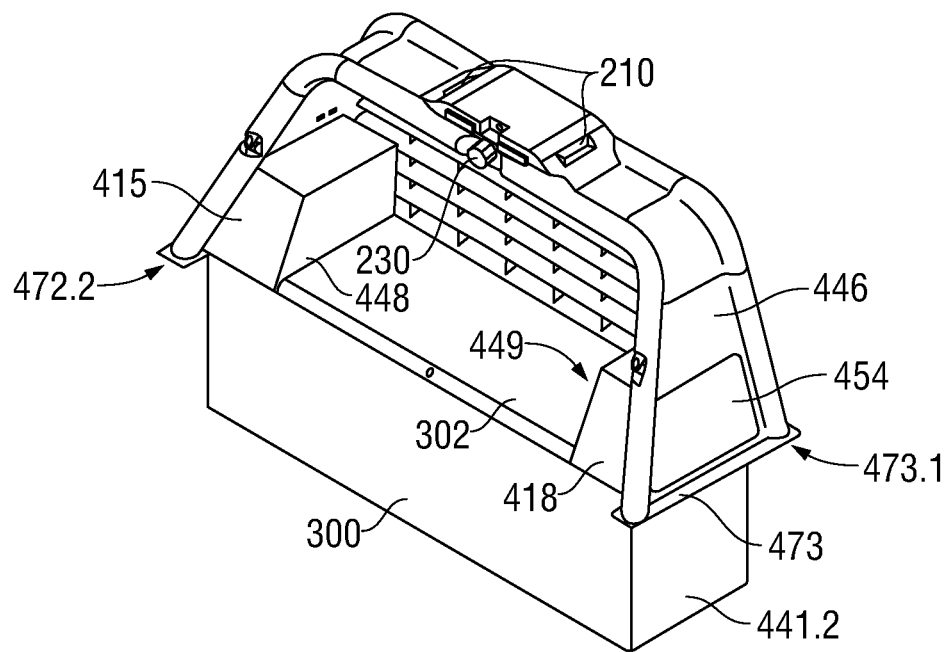
FIG. 5 is an isometric view, including right side, of a safety system for a truck, according to one or more embodiments of the invention.
Figure 5A:
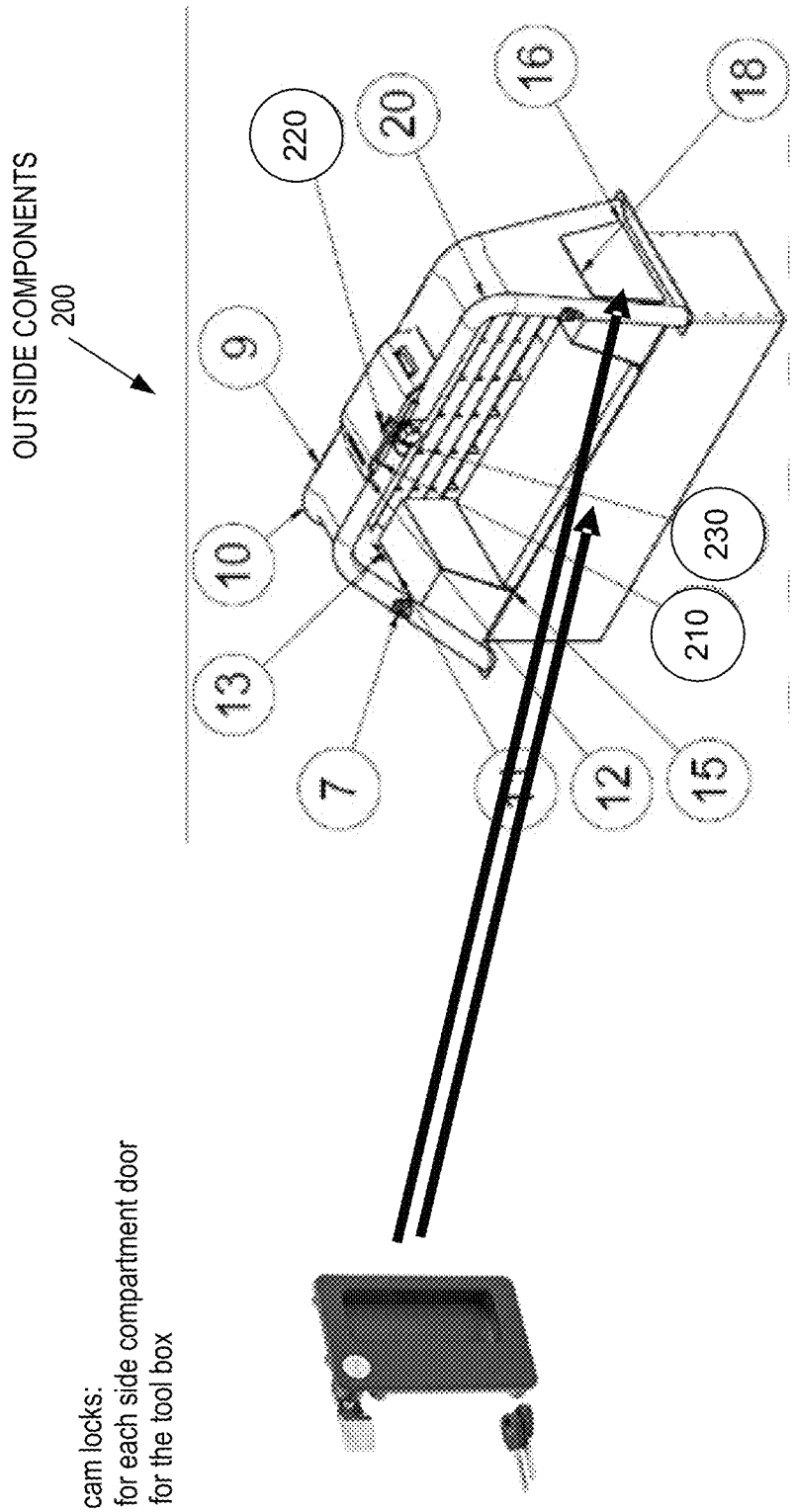
FIG. 5A is an isometric view, including cam lock detail, of a safety system for a truck, according to one or more embodiments of the invention.
Figure 7:
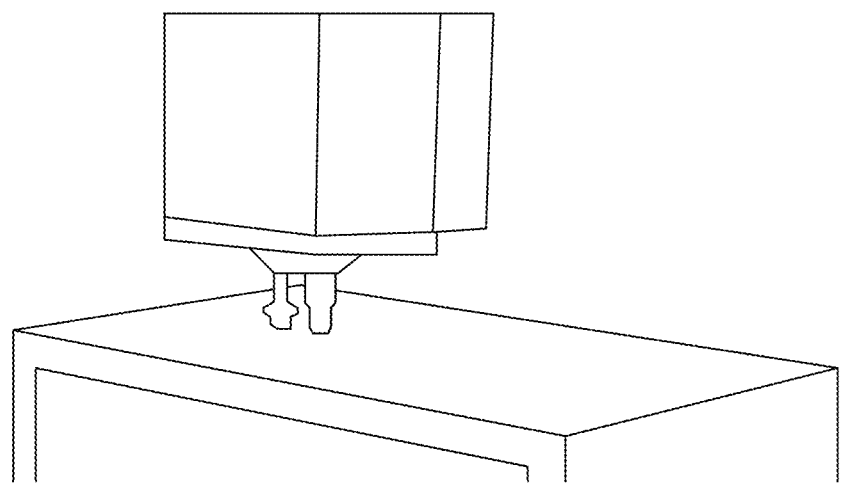
FIG. 7 is a Vortex AC Enclosure Cooler System included in a safety system for a truck, according to one or more embodiments of the invention.
Figure 7:
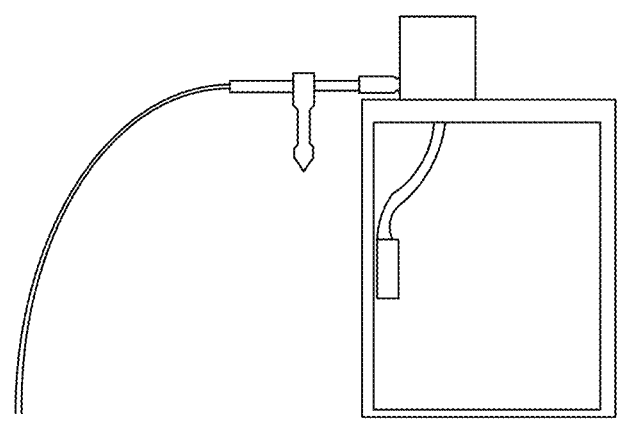
Figure 8:
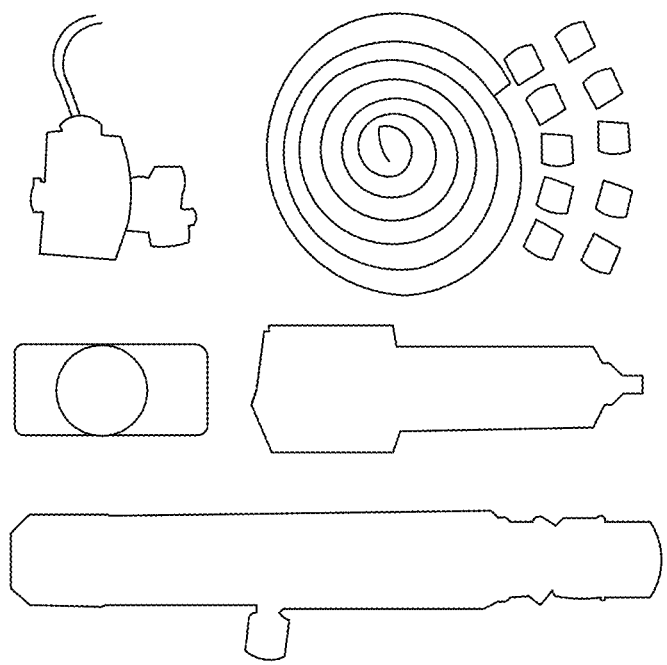
FIG. 8 depicts parts for installing a Vortex AC Enclosure Cooler System included in a safety system for a truck, according to one or more embodiments of the invention.
Figure 8:
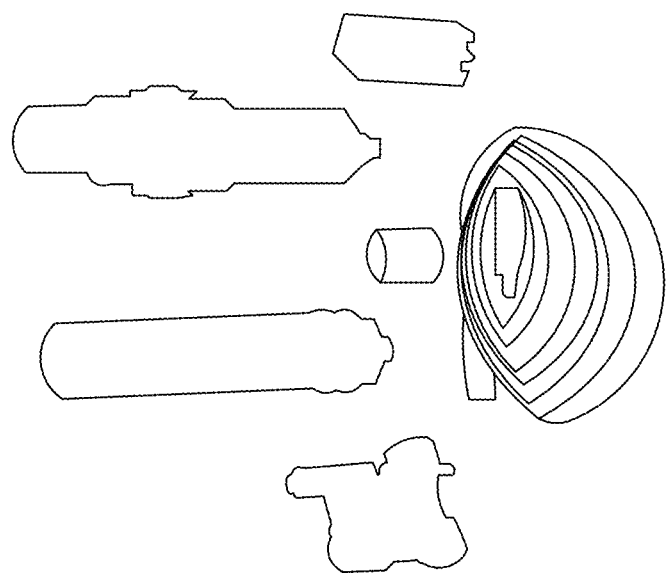

Side storage compartments 415 and 418 may be extended to the floor of the truck bed as standalone units. Alternatively, sheet base floor 408 of the side compartments may be hinged to allow access to toolbox 300 with hinges 14 and 17 on the opposite side of side storage doors 452 and 453. The side storage compartments may include cam locks as shown in FIG. 5A. The side storage compartments may include lighting inside, activated when the toolbox lid is open.

As shown in FIG. 1, electrical components located on the headache bar are controlled by controls 202 and control console 105, where console 105 is configured for locating inside a cab of the vehicle.

Figure 9:
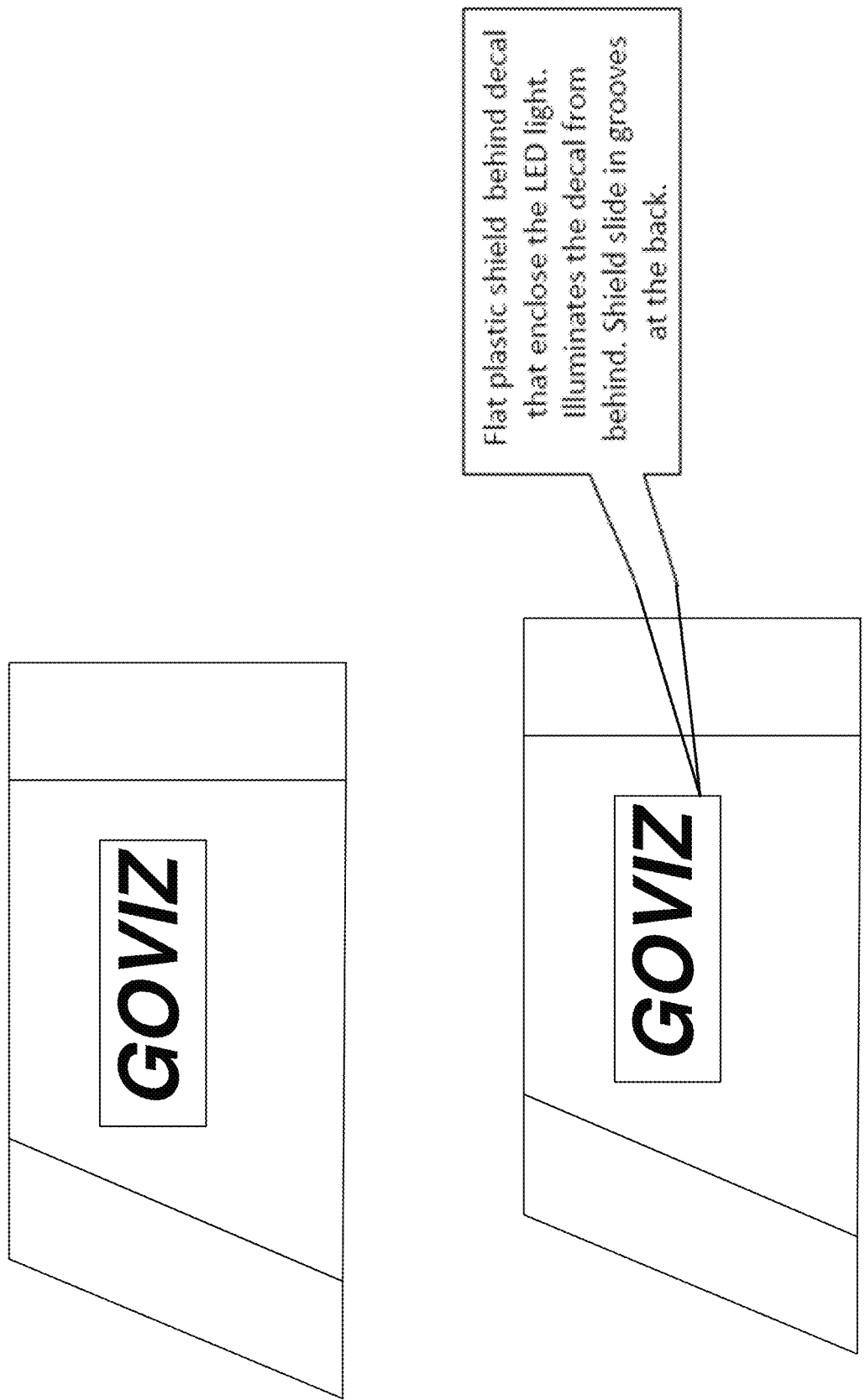
FIG. 9 depicts details of an area of the side of a safety system for a truck reserved for cut out logos, other decals, or other smaller standalone compartments, according to one or more embodiments of the invention.

An area of the side of headache rack above side storage doors 452 and 453 is reserved for cut out logos or other decals as depicted in FIG. 9, or other smaller standalone compartments. A flat plastic shield behind the decal may enclose an LED light for illuminating the decal from behind. In another embodiment, the decal area is configured to receive a removable plate. Various such plates may be provided having respective themes, logos or tattoos.

As described herein above, headache rack has tubes 10 and 20 and shell 411. However, the structure and configuration of headache rack may be vary depending on the vehicle and application.

It should be appreciated from the foregoing that specific difficulties in providing safety equipment are recognized and addressed in embodiments of the present invention, including at least the following.

The included side storage 415 and 418 provides a way to safely store long flag whips on a vehicle after work hours, which avoids storing them on the job site where they may get misplaced and lost. This also avoids the tendency of a vehicle operator to use shorter, convenient-length flag whips, which operators sometimes do in order to facilitate easier storage in spite of the resulting risk that the shorter flags will not be seen by larger vehicle operators.

Providing strobe lights 210 in low profile assembly 205 mounted on rack as described herein is aesthetically pleasing, which provides motivation for drivers to include the strobe lights on their vehicles. In contrast, strobe lights are conventionally attached to vehicles such as pickup trucks in a way that is not aesthetically pleasing, particularly for drivers who take their vehicles home after work, so that drivers may be inclined to omit them. Another conventional option is to attach strobe lights to the roof of the cab via strong magnets so they can be removed when not needed. This requires power cables running through the window of the cab which can destroy the weather seal around the window. Placing the strobe with magnets on a horizontal plate on the headache rack requires climbing back and forth in the truck to remove it, which discourages their use.

The included backup alarms 230—i.e., audible alarms that automatically generate a distinctive loud sound when a vehicle is in reverse gear—are provided on a headache rack for pickup trucks of all sizes. Such alarms are conventionally provided on large work trucks but not pickups. Even after market backup alarms are ordinarily added only to larger work trucks. This may be because backup alarms are perceived as optional for pickup trucks, since federal safety requirements for pickup trucks only require drivers to manual operate a steering-wheel-mounted horn before moving backwards. Drivers may easily neglect such manual horn operation when backing, which increases risk of accidents.

The included backup camera 220 is fixed high up on the headache rack, which enables viewing loads in the truck bed and in a trailer hitched to the truck. This enables early detection of a shifting load that is being hauled and thereby mitigates safety incidents. Backup cameras are known, both as manufacturer provided equipment for recently made vehicles and as aftermarket equipment. However, the locations of such conventional backup cameras are on the tailgate or license plate areas, which does not enable viewing a load in the truck bed and in a trailer hitched to the truck.

The included lighting 210, 240, 250 and 260 mounted on headache bar eliminates the need to modify the vehicle. Aftermarket lighting such as a light bar and spotlight may conventionally be installed, but this tends to require modifications to the vehicle body for mounting.

The included side storage 415 and 418 is useful for personal protection equipment (PPE), which is mandatory on most work sites. PPE includes protective glasses, gloves, helmets, and boots, for example. Wheel chocks are also mandatory for most sites and may also be stored in the side storage. Storing these items in a toolbox in the truck bed necessitates climbing up and down into the truck bed or stretching to open from the side of the truck. This has led to slip and trip incidents and muscle injuries. Keeping these in the truck cab is often undesirable because of the often wet or dirty condition of some of this equipment.

The following are additional aspects, including actions that applications 204 of controls 202 perform:
  Extend flagpole and turn on strobe lights, which forces the configuration required in most mine sites, for example.
  Sound backup alarm with unique pitch when an object approaches the vehicle from any direction within a certain radius and cause camera to record a 360 degree video for the duration of the alarm, which creates a visual record of risk environment. Also, turn on rear flood lights together with backup alarm when reversing and darkness is detected, which assists with safe reversing.
  Synchronize optical camera shutters with white strobe light when darkness is detected to capture clear night images, including still and video.
  Stereoscopic cameras are placed in all 4 wheel-wells and are extensions of the entire camera system centered in the rack hump. The wheel well cameras work with controls 202 to provide a tire safety management application 204 that may be provided for the safety system 100, which uses photogrammetry to detect and report tire wear. Cameras are protected by high impact non scratch glass and have mini light flash.
  Camera(s) on the protection structure are configured to take geotagged pictures that an app of the system overlay on a site map, which the app uploads to an enterprise account in a cloud accessible by a user via the system app using QR Reader 286 for checking operation status, hazardous areas etc.
  QR Reader 286 further gives access to additional company safety information such as site map navigation, site specific safety video training if needed, PPE checklists, messages etc.
  A system database tracks visitor safety records and alerts both the operator and site management via the controller or text as soon as non-compliance is detected such as when mandatory site training is due.
  RF tag sensor 282 and apps 204 work with backup alarm 230 to provide a unique sound that indicates a missing tool, which ensures correct tools are available for jobs.
  Hazardous crossings such as mud and high water when detected by LIDAR 284 and apps 204 automatically captures a geotagged picture of the hazard and uploads it as an overlay on a site map for others to access, which ensure others avoid the hazard.

It should be appreciated from the foregoing that the disclosed safety system is not merely a collection of independent safety components. Rather, by integrating the components into a unified system, this enables the components to cooperatively interact with one another. In other examples besides the above, the flag is of a telescoping type and is provided with a motor such that the controls for the system automatically extend the flag when the strobe lights are activated in one or more embodiments. The strobe lights are activated, for example, by the driver flipping a switch on the console. In another example, whenever the back alarm is on, the controls turn on the backup camera to give added assistance when reversing. In another example, the front and rear high beam lights may be interlocked so that the front lights are not active when the rear lights are active and vice versa. This increases driver focus and also saves energy.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

The separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed. It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A safety system for a truck, wherein the truck has a cab and a truck bed, and the truck bed has sidewalls, and wherein the safety system comprises:
    a protection structure;
    a container structure having connections to the protection structure;
    a plurality of safety devices; and
    a control for the plurality of safety devices implementing a control application for the safety system, wherein the control application is configured to:
      cause a second action performed by a second safety device of the plurality of safety devices based on a first action performed by a first safety device; and
    wherein the container structure comprises:
    a toolbox of a predetermined length that fits between first and second sidewalls of the truck bed, wherein when the toolbox is fitted between the truck bed sidewalls a first side of the toolbox faces the truck bed first sidewall and a second side of the toolbox faces the truck bed second sidewall;
    a first storage unit mounted to the toolbox in a cantilever position above the first toolbox side, wherein an overhanging portion of a bottom of the first storage unit overhangs a top of the first truck bed sidewall when the toolbox is fitted between the truck bed sidewalls; and
    a second storage unit mounted to the toolbox in a cantilever position above the second toolbox side, wherein an overhanging portion of a bottom of the second storage unit overhang a top of the second truck bed sidewall when the toolbox is fitted between the truck bed sidewalls;
    wherein the first storage unit has a first side facing a first side of the second storage unit and the toolbox has a top lid between the first sides of the respective storage units and;
    wherein the first storage unit defines an opening opposite the first storage unit's first side and has a cover on the opening configured to open for accessing an interior of the first storage unit, wherein when the toolbox is fitted between the truck bed sidewalls, the interior of the first storage unit is accessible through the opening to a user outside the truck bed facing an exterior side of the first truck bed sidewall; and
    wherein the second storage unit defines an opening opposite the second storage unit's first side and has a cover on the second storage unit's opening configured to open for accessing an interior of the second storage unit, wherein when the toolbox is fitted between the truck bed sidewalls, the interior of the second storage unit is accessible through the second storage unit opening to a user outside the truck bed facing an exterior side of the second truck bed sidewall; and
    wherein the protection structure comprises:
    a first rigid member including first and second lateral portions and joined by a central portion having a length that, when the toolbox is between the truck bed sidewalls, positions the first lateral portion within a predetermined distance of the first truck bed sidewall for a first one of the connections to the container structure and positions the second lateral portion within the predetermined distance of the second truck bed sidewall for a second one of the connections to the container structure; and
    a second rigid member having first and second lateral portions and that are joined by a central portion of the second rigid member having a length that, when the toolbox is between the truck bed sidewalls, positions the second rigid member's first lateral portion within the predetermined distance of the first truck bed sidewall for a third one of the connections to the container structure and positions the second rigid member's second lateral portion within the predetermined distance of the second truck bed sidewall for a fourth one of the connections to the container structure;
    wherein the lateral portions of the rigid members are of predetermined lengths that position their respective central portions above a top of the truck's cab when the toolbox is between the truck bed sidewalls.

2. The safety system of claim 1, wherein the container structure comprises:
    a first connecting member attached to the overhanging portion of the first storage unit and includes the first and second extension portions extending beyond the overhanging portion of the first storage unit and along portions of the top of the truck bed's first sidewall when the toolbox is fitted between the truck bed sidewalls; and
    a second connecting member attached to the overhanging portion of the second storage unit and includes the first and second extension portions extending beyond the overhanging portion of the second storage unit and along portions of the top of the truck bed's second sidewall when the toolbox is fitted between the truck bed sidewalls;
    wherein the container structure connections to the protection structure include connections of the first lateral portions of the first and second rigid members to respective ones of the connecting member first extension portions and connections of the second lateral portions of the first and second rigid members to respective ones of the connecting member second extension portions.

3. The safety system of claim 1, wherein the first safety device is a LIDAR, wherein the first action detects a hazardous crossing via the LIDAR, wherein the second safety device is a backup camera, and wherein the second action captures an image of the hazardous crossing to upload as a geotagged picture for an overlay on a site map.

4. The safety system of claim 1, wherein the safety system further comprises an assembly, wherein the first safety device is one or more strobe lights included in a housing of the assembly, wherein the housing is fastened to the protection structure in a position such that the protection structure holds the housing above the cab roof when the tool box is positioned between the truck bed side walls, wherein the one or more strobe lights are visible through openings in the housing when the one or more strobe lights are activated, wherein the first action activates the strobe lights, wherein the second safety device is a motorized telescoping flag, and wherein the second action extends the motorized telescoping flag.

5. The safety system of claim 1, wherein the first safety device is a QR reader, wherein the first action obtains via the QR reader access to additional safety information, wherein the second safety device is a monitor, and wherein the second action displays the additional safety information obtained via the QR reader, wherein the additional safety information comprises a geotagged picture of a hazardous site.

6. The system of claim 1, wherein the first safety device is one or more stereoscopic cameras placed in respective wheel wells of the truck, wherein the first action obtains one or more images via the one or more stereoscopic cameras to use photogrammetry to detect tire wear, wherein the second safety device is a monitor, and wherein the second action displays a report of the tire wear.

7. A safety system for a truck having a truck bed, wherein the truck bed has sidewalls, the system comprising:
 a container structure connected to a protection structure;
 a plurality of safety devices; and
 a control for the plurality of safety devices implementing a control application for the safety system, wherein the control application is configured to:
  cause a second action performed by a second safety device of the plurality of safety devices based on a first action performed by a first safety device; and
 wherein the container structure comprises:
  a toolbox; and
  first and second storage units;
  wherein the toolbox is connected to the storage units and has a lid configured to open and close between the storage units;
  wherein each storage unit is positioned on the toolbox to overhang a respective one of the sidewalls when the toolbox is fitted between the sidewalls, and the storage units define respective openings above the respective sidewalls for accessing interiors of the respective storage units from outside the truck bed; and
 wherein the protection structure comprises:
  first and second rigid members, each member including lateral portions and a central portion, wherein the lateral portions are connected to the container structure and support the respective central portions above a cab of the truck for protection against overhead impact when the toolbox is fitted between the sidewalls.

8. The system of claim 7, wherein each storage unit has a hinged bottom that opens for accessing the toolbox.

9. The system of claim 7,
 wherein the plurality of safety devices are mounted on the protection structure, the plurality of safety devices comprising:
  a motorized telescopic flag whip;
  electronic devices including strobe lights, a backup camera, a monitor, a backup horn, backup lights and first high beam lights; and
  wherein the safety system further comprises an assembly including a housing containing the strobe lights and the backup camera, wherein the housing is fastened to the protection structure in a position such that the protection structure holds the housing above the cab roof when the tool box is positioned between the truck bed side walls, wherein the strobe lights are visible through openings in the housing when the strobe lights are turned on and a lens of the backup camera points toward the rear of the pickup truck through an opening in the housing;
 wherein the monitor and the camera are configured to communicate when the camera is active to produce a video stream from the camera on the monitor;
 wherein the backup horn is attached to the protection structure and has controls configured to receive a signal from transmission linkage of the truck, the backup horn controls responsively cause the horn to produce an audio alarm when the linkage indicates a reverse gear of the truck is engaged;
 wherein the high beam lights are attached to the protection structure in positions such that when the ends of the lateral portions are positioned above the side walls the protection structure holds the high beam lights above the cab roof pointing ahead of the pickup truck; and
 wherein the backup lights are attached to the protection structure in positions such that when the toolbox positioned between the truck bed side walls the protection structure holds the backup lights pointing beyond the rear portion of the pickup truck, the backup lights have controls configured to receive the signal from the transmission linkage and responsively turn on the backup lights when the linkage indicates a reverse gear of the truck is engaged.

10. The safety system of claim 7, further comprising second high beam lights, wherein the second high beam lights are attached to the protection structure in positions such that when the ends of the lateral portions are positioned between the side walls of the pickup truck bed the protection structure holds the second high beam lights pointing behind the pickup truck.

11. The safety system of claim 7, wherein the safety system further comprises an assembly, wherein the first safety device is one or more strobe lights, wherein the second safety device is one or more backup cameras, wherein the one or more strobe lights and the one or more backup cameras are included in a housing of the assembly, wherein the housing is fastened to the protection structure in a position such that the protection structure holds the housing above the cab roof when the tool box is positioned between the truck bed side walls, wherein the one or more strobe lights are visible through openings in the housing when the one or more strobe lights are activated and a lens of the backup camera points toward the rear of the pickup truck through an opening in the housing, wherein the first action activates the strobe lights, and wherein the second action synchronizes respective shutters of the one or more backup cameras with the one or more strobe lights when darkness is detected.

12. The safety system of claim 7, wherein the first safety device is an RF tag sensor, wherein the first action detects via the RF tag sensor that a tool is missing, wherein the second safety device is a backup alarm, and wherein the second action provides a sound via the backup alarm to indicate that the tool is missing.

13. The safety system of claim 7, wherein the first safety device is a backup alarm, wherein the first action provides a sound via the backup alarm when an object approaches the vehicle from any direction with a certain radius, wherein the second safety device is a backup camera, and wherein the second action captures a 360 degree video via the backup camera for a duration of the sound provided via the backup alarm.

14. A safety system for a pickup truck having a bed with side walls in a rear portion of the truck for hauling materials, wherein the safety system comprises:
  a structure comprising:
    first and second bars, each respective one of the bars including lateral portions joined by a central portion, wherein the central portion holds the lateral portions apart for fitting ends of the lateral portions at the side walls, wherein the lateral portions are configured to hold the central portion above a cab roof of the pickup truck when the toolbox is positioned between the side walls;
    a shell connected to the bars and spanning at least a portion of space there between; and
  storage comprising:
    a toolbox connected to the lateral portions of the bars; and
    side compartments attached to the shell and held between the lateral portions of the bars;
  a plurality of safety devices, comprising:
    a motorized telescopic flag whip;
    electronic devices including strobe lights, a backup camera, a monitor, a backup horn, backup lights and first high beam lights; and
    an assembly including a housing containing the strobe lights and the backup camera, wherein the housing is fastened to the structure in a position such that the structure holds the housing above the cab roof when the toolbox is positioned between the side walls, wherein the strobe lights are visible through openings in the housing when the strobe lights are turned on and a lens of the backup camera points toward the rear of the pickup truck through an opening in the housing;
    wherein the monitor and the camera are configured to communicate when the camera is active to produce a video stream from the camera on the monitor;
    wherein the backup horn is attached to the structure and has controls configured to receive a signal from transmission linkage of the truck, the backup horn controls responsively cause the horn to produce an audio alarm when the linkage indicates a reverse gear of the truck is engaged;
    wherein the high beam lights are attached to the structure in positions such that when the toolbox is positioned between the side walls the structure holds the high beam lights above the cab roof pointing ahead of the pickup truck; and
    wherein the backup lights are attached to the structure in positions such that when the toolbox is positioned between the side walls the structure holds the backup lights pointing beyond the rear portion of the pickup truck, the backup lights have controls configured to receive the signal from the transmission linkage and responsively turn on the backup lights when the linkage indicates a reverse gear of the truck is engaged; and
  a control for the plurality of safety devices implementing a control application for the safety system, wherein the control application is configured to:
    cause a second action performed by a second safety device of the plurality of safety devices based on a first action performed by a first safety device.

15. The safety system of claim 14, further comprising cooling equipment configured for cooling at least one of the side compartments.

16. The safety system of claim 14, wherein the monitor is integrated into a mirror for attachment to the truck.

17. The safety system of claim 14, wherein the first safety device is the strobe lights included in a housing of the assembly, wherein the first action activates the strobe lights, wherein the second safety device is the motorized telescoping flag, and wherein the second action extends the motorized telescoping flag.

18. The safety system of claim 14, wherein plurality of safety devices further comprises a QR reader, wherein the first safety device is the QR reader, wherein the first action obtains via the QR reader access to additional safety information, wherein the second safety device is the monitor, and wherein the second action displays the additional safety information obtained via the QR reader.

19. The safety system of claim 14, wherein the first safety device is the strobe lights, wherein the second safety device is the backup camera, wherein the first action activates the strobe lights, and wherein the second action synchronizes respective shutters of the one or more backup cameras with the one or more strobe lights when darkness is detected.

20. The safety system of claim 14, wherein the plurality of safety devices further comprises an RF tag sensor, wherein the first safety device is the RF tag sensor, wherein the first action detects via the RF tag sensor that a tool is missing, wherein the second safety device is the backup alarm, and wherein the second action provides a sound via the backup alarm to indicate that the tool is missing.

* * * * *